UNITED STATES PATENT OFFICE 2,043,458

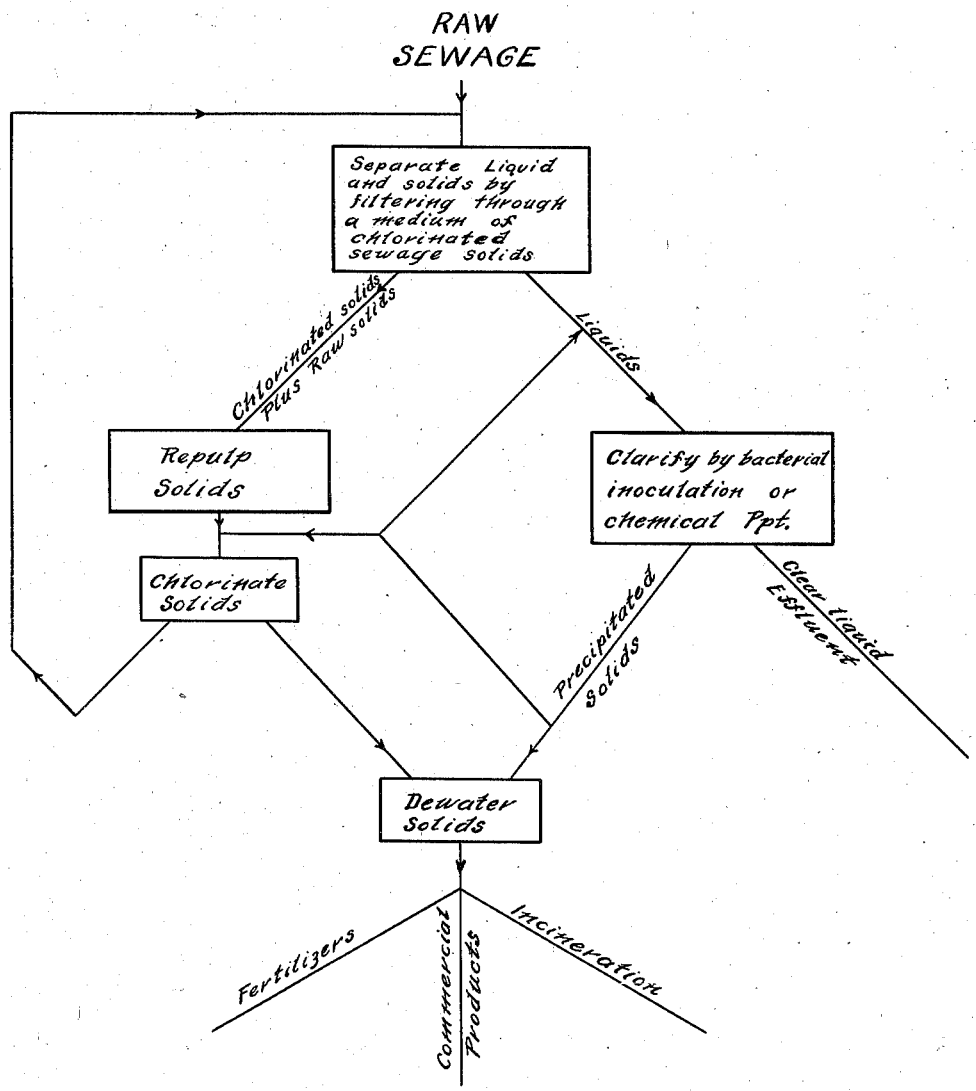

PROCESS OF TREATING SEWAGE

Clifton N. Windecker and Charles E. Lyon, Painesville, Ohio; said Lyon assignor to said Windecker Application October 6, 1932, Serial No. 636,616

5 Claims. (Cl. 210—2)

This invention relates to the treatment of sewage, and more particularly in complete manner; it being among the objects of the invention to provide a complete process for treating sewage such as to make possible a clear, sterile effluent that will increase rather than lower the oxygen content of streams into which it may be discharged, and which will produce a sterile, easily dewaterable sludge that can be incinerated substantially without odor, or be converted into merchantable products of value. A further object is the provision of a process which may be applied to all ordinary sewage conditions and which may be kept under constant and accurate control, and at a cost representing substantial savings over hitherto-known practice. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

In said annexed drawing:

The sole figure is a schematic flow-sheet illustrative of the invention.

In accordance with our process, primarily the sludge is coagulated and removed from the main body of the sewage. This may be accomplished by contacting raw sewage with returned chlorinated sludge. To such purpose, incoming sewage is initially subjected to settling, for instance, to provide a sewage sludge of substantial concentration, from 0.5% to 3% of dry solids. This is chlorinated, and becomes flocculent and rather fibrous. The chlorine may be introduced in gaseous or liquid form, as desired, and in amounts depending upon conditions, and for example may be about one-fourth pound more or less per pound of organic matter in the sludge. Such chlorinated sludge is now contacted with raw sewage material, for instance either (a) by the cycle of mixing the chlorinated sludge with raw sewage, settling, removing, then chlorinating the sludge to the desired amount and returning a suitable portion to the raw sewage, and taking out the accumulated surplus portion of chlorinated sludge which is now sterile for dewatering and disposal. Or (b), by the cycle of forming a filtering layer of the chlorinated sewage sludge on a suitable filtering surface, as a stationary bed, or a traveling filter-surface operating with or without a vacuum, and bringing the raw sewage onto the surface of such chlorinated filtering layer, to be filtered therewith and through. The layer of chlorinated sludge with its accumulated raw sludge is removed, repulped or diluted with water or effluent, stirred, and is chlorinated to the desired amount, a portion of the chlorinated sludge thence being returned to the prior zone for collecting the raw sludge, and the accumulated surplus of chlorinated sludge which is now sterile is taken out for dewatering and further disposal, as will be referred to more in detail hereinafter. In either case, as seen, the step of chlorinating is applied effectively to a concentrated material without unnecessary waste and the extent of chlorination may be readily controlled to the desired amount, for instance ranging from 2 to 20% based on the dry weight of the solids, depending upon the degree of sterility desired.

Sewage sludges such as the so-called activated sludge obtained in the well known activated sludge process, as well as the sludges mentioned above, may be effectively and economically coagulated and sterilized by treatment with chlorine.

Properly chlorinated sludge dewatered in any suitable or convenient manner, is entirely innocuous, of bleached appearance, and considerably like beaten chlorinated paper pulp, although somewhat more grayish, and it may be dried and incinerated without creating undesirable odors.

By reason of its paper-pulp-like properties also, it may be made up into merchantable products on the order of sheeted or molded paper-like or board material.

The main body of the sewage after the removal of the sludge as above set forth, while sterilized by the chlorinated return sludge may have a cloudy appearance due to finely divided suspensoids which are made more apparent by the bleaching action of the chlorine. This cloudiness may next be removed to produce a desirable clarity and round out the complete process of sewage treatment, for instance in some cases by re-inoculating with the desired bacteria for bacterial decomposition, the excess sludge resulting from this treatment being returned to the chlorinated sludge circuit, instead of to a digestor as would be customary in usual bacterial treatment. It will be noted that in the first part of our process, complete chlorination has killed the pathological and objectionable bacteria, and we have found that reinoculation can now be made by means of pure cultures of desirable bacteria for further action, which then proceeds very favorably. It will be further noted that when returning the excess activated sludge to the chlorinated sludge cycle all foaming and other objectionable features heretofore characteristic with activation treatment in a digestor are entirely avoided. In some cases, instead of clarifying the cloudy sewage effluent by bacterial treatment, as just detailed, we may clarify by forming a floc by suitable chemical means. Where the natural hardness of the water is such as to initially provide calcium bicarbonate and magnesium compounds, these may be availed of in reaction by addition of suitable agents, to form a floc and carry down the finely suspended semi-colloidal matter. Hydroxides of sodium, potassium, calcium, magnesium, barium, etc. may variously be employed, but best and most cheaply, the flocculation may be accomplished by addition of calcium hydroxide in slurry or in solution, the amount of calcium hydroxide varying with conditions of initial water hardness, etc. The solution is preferred, as we have found that it forms a more effective floc than is attained by a slurry. A convenient manner of attaining such solution may be accomplished by diverting a small portion of the cloudy effluent through a lime saturator or container of lime through which the liquid may flow, and then introducing this saturated solution of calcium hydroxide into the main body of effluent at a desired point. The coagulated solids resulting from this treatment may then be removed in suitable manner, such as by settling, sand filter beds, or mechanical filters, etc. Under certain conditions a portion of this floc may be advantageously returned to the main body of cloudy effluent to assist in flocculation, or can be disposed of with the above-mentioned chlorinated sludge, or separately. The clarified effluent either from the bacterial clarification, or from the chemical flocculation, is now in suitable condition to be drained or discharged to any stream or body of water. Where the natural purity of the water is such as to furnish no basis for flocculating action with calcium hydroxide, etc., the agents added may be such as are of a coagulant character otherwise, such as alum, ferric chloride, etc.

It is thus seen that our process offers the important advantages of being able to treat sewage in a complete, continuous manner, portions being maintained in cycle for contributing to the progress and stability of the process, while the end products are a clear, sterile effluent safe for discharge into streams, and a dewatered innocuous solid material which may be disposed of without detriment or even with profit in products applicable to various uses. From the standpoint of handling also, important advantages will be obvious to those skilled in the art, there being an elimination of the nuisance factors and handicaps heretofore customarily associated with sewage treatment.

Other modes of applying the principle of the invention may be employed, change being made as regards the details described, provided the steps stated in any of the following claims, or the equivalent of such, be employed.

We therefore particularly point out and distinctly claim as our invention:—

1. A method of treating sewage, which comprises forming a filter-bed of chlorinated sewage sludge, filtering raw sewage through such bed, re-pulping the obtained sludge, chlorinating this sludge, returning a portion of the chlorinated sludge to form the filter-bed afore-mentioned, dewatering, and disposing of the surplus sludge, clarifying the liquid, and discharging the clarified effluent.

2. A method of treating sewage, which comprises forming a filter bed of chlorinated sewage sludge, filtering raw sewage through such bed, re-pulping the obtained sludge, chlorinating this sludge, returning a portion of the chlorinated sludge to form the filter-bed afore-mentioned, dewatering, and disposing of the surplus sludge, inoculating the liquid with bacteria for clarification, returning the excess bacterial sludge to the chlorinated sludge circuit, and finally discharging the clarified effluent.

3. A method of treating sewage, which comprises forming a filter-bed of chlorinated sewage sludge, filtering raw sewage through such bed, re-pulping the obtained sludge, chlorinating this sludge, returning a portion of the chlorinated sludge to form the filter-bed afore-mentioned, dewatering, and disposing of the surplus sludge, forming a floc in the liquid, separating the coagulated solids after such flocculation, returning a portion of the flocculated solids to assist in forming more flocs, disposing of the excess flocculated solids, and finally discharging the clarified effluent.

4. A method of treating sewage, which comprises forming a filter-bed of chlorinated sewage sludge, filtering raw sewage through such bed, re-pulping the obtained sludge, chlorinating this sludge, returning a portion of the chlorinated sludge to form the filter-bed afore-mentioned, dewatering, and disposing of the surplus sludge, forming a floc in the liquid by calcium hydroxide, separating the coagulated solids after such flocculation, returning a portion of the flocculated solids to assist in forming more flocs, disposing of the excess flocculated solids, and finally discharging the clarified effluent.

5. A method of treating sewage, which comprises forming a filter-bed of chlorinated sewage sludge, filtering raw sewage through such bed, re-pulping the obtained sludge, chlorinating this sludge, returning a portion of the chlorinated sludge to form the filter-bed afore-mentioned, dewatering, and disposing of the surplus sludge, forming a floc in the liquid by calcium hydroxide solution, separating the coagulated solids after such flocculation, returning a portion of the flocculated solids to assist in forming more flocs, disposing of the excess flocculated solids, and finally discharging the clarified effluent.

CLIFTON N. WINDECKER.
CHARLES E. LYON.